United States Patent

[11] 3,550,624

| [72] | Inventor | Fielding G. Johnson |
| --- | --- | --- |
| | | Santa Ana, Calif. |
| [21] | Appl. No. | 724,865 |
| [22] | Filed | Apr. 29, 1968 |
| [45] | Patented | Dec. 29, 1970 |
| [73] | Assignee | Hydrodata, Inc. |
| | | Costa Mesa, Calif. |
| | | a corporation of California |

[54] FLUID COUPLING DEVICE
10 Claims, 3 Drawing Figs.
[52] U.S. Cl..................................................... 137/614,
137/614.05, 137/614.06, 137/239
[51] Int. Cl....................................................F16k 15/00,
F16l 37/28
[50] Field of Search.......................................... 137/614,
614.05, 614.06, 239, 550

[56] References Cited
UNITED STATES PATENTS
3,348,575  10/1967  Simar............................ 137/614.06

*Primary Examiner*—William F. O'Dea
*Assistant Examiner*—William H. Wright
*Attorney*—Spensley and Horn ABSTRACT: A fluid coupling device having a hose portion and a bulkhead portion. A first poppet valve is located in the hose portion. The valve is adapted to open when the hose portion and the bulkhead portion are coupled together. A fluid reservoir is located in the hose portion adjacent the first poppet valve. A second poppet valve is located within the bulkhead portion of the device. Fluid under pressure enters the inlet port of the hose portion. The two portions are then coupled together and the first poppet valve is opened allowing the fluid under pressure to flow along the interfaces between the hose portion and bulkhead portion into the fluid reservoir. Thus, the hose portion and bulkhead portion are flushed and freed of contamination. Fluid flows into the bulkhead through the second poppet valve which opens under pressure.

PATENTED DEC 29 1970  3,550,624
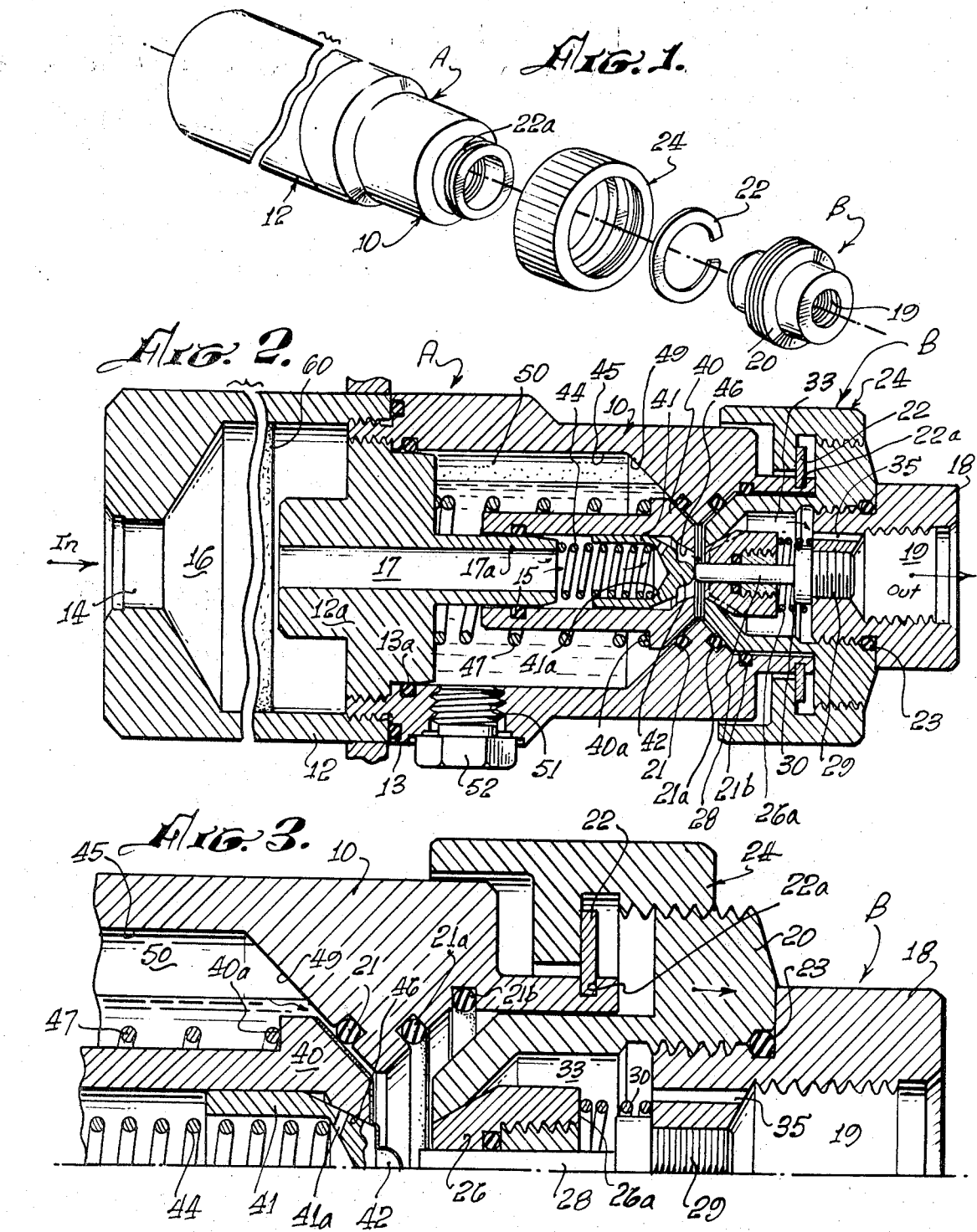
INVENTOR.
FIELDING G. JOHNSON,
By His Attorneys
Spensley & Horn.

3,550,624

FLUID COUPLING DEVICE

BACKGROUND OF THE INVENTION

1. Field of the Invention

This invention relates to a fluid coupling device for freeing fluid flowing therethrough from contamination. More particularly, this invention relates to a device for coupling a hose to a bulkhead and flushing the interfaces between the hose and bulkhead to free them of any contamination before fluid is passed from the hose into the bulkhead.

2. Background of the Invention

All components of hydraulic systems contain some contamination such as metal particles from machining and grinding, abrasive compounds from honing and lapping, dirt from hands and tools and the like. More contamination is introduced during assembly of the system. In modern aircraft, for example, hydraulic fluid is pumped into the aircraft under pressure. The fluid originally in the container is generally contaminated as is the hose nozzle through which the fluid is pumped and the permanent bulkhead attachment to which the hose is connected. Generally, to recondition the fluid a hand operated fill stand is used which consists of a reservoir, a hand pump, a filter and delivery hose.

The problem has been partially solved by installing a filter element into the line from the hydraulic pump which pumps the fluid into the aircraft. This removes contamination found in the original fluid reservoir. However, the problem still remains of contamination gathering in the hose nozzle and in the bulkhead attachment to which the nozzle is fitted for pressurized fluid delivery. The contamination from the nozzle and in the bulkhead is very difficult to see and may be of extremely small size such, for example, as five microns. The source of contamination is the atmosphere and the hands of servicing personnel. Furthermore, the interior of the delivery hose may deteriorate after continued exposure to hydraulic fluid. These hose particles then gather in the nozzle end and tend to contaminate the fluid as it flows into the bulkhead. This contamination causes much damage in the aircraft hydraulic systems and is extremely dangerous. No prior art system is available for flushing the delivery hose nozzle or the bulkhead attachment without wasting much fluid and occasionally flushing some of the contamination further into the hydraulic system. Generally, a complete draining of the hydraulic system is necessary to flush effectively. Although much attention has been given to flushing stands which recondition hydraulic fluid in addition to filtering it, the problem of the hose nozzle and bulkhead interface areas has not been satisfactorily solved.

Accordingly, it is an object of the present invention to provide a fluid coupling in which the hose and bulkhead interfaces are flushed prior to delivering fluid into the bulkhead.

Another object of the present invention is to provide a fluid coupling having a fluid reservoir into which a first amount of fluid is discharged after the interface surfaces have been flushed thereby; the flushing system is activated when a hose portion and the bulkhead portion are coupled together.

Yet another object of the present invention is to provide a fluid coupling having a filter unit through which fluid first passes and a plurality of poppet valves which are sequentially activated by fluid pressure differentials when the hose portion and the bulkhead portions are coupled together.

SUMMARY OF THE INVENTION

In one of its broadest aspects, the present fluid coupling device comprises a first hose housing having an inlet port for fluid and having an outlet port, and a second permanent housing having inlet ports and an outlet port. Means for coupling the first hose housing to the second permanent housing are provided. A fluid reservoir is located adjacent the outlet ports of the first hose housing. A first valve means is located within the first hose housing, the first valve means being adapted to opening and closing the outlet port in the first hose housing. A second valve means is located within the second permanent housing, the second valve means being adapted to opening and closing the inlet ports of the second housing. Means are connected to the second valve means for cooperatively engaging and opening the first valve means. Means are connected to the second valve means for cooperatively engaging and opening the first valve means. Means are connected to the second valve means for allowing a fluid under pressure to leave the first housing and to enter the fluid reservoir and additional means are connected to the second valve means for opening the second valve means at a predetermined pressure and for allowing fluid to enter the second permanent housing.

Fluid under pressure enters the first hose housing which is then coupled to the permanent housing attached to a bulkhead. The first valve means is then unseated and fluid is allowed to flow along the interfaces of the first hose housing and the second permanent housing into the fluid reservoir. Thus, the interfaces of the hose and the bulkhead attachment are flushed, the contamination being flushed into the fluid reservoir. When the fluid reservoir is full, the fluid pressure opens the second valve means and allows fluid to flow into the bulkhead.

The invented device allows the efficient decontamination of hose to bulkhead connections used in hydraulic servicing units. This system is particularly useful in high pressure aircraft systems where the slightest contamination creates a hazard. The device has the advantage of providing a filter unit to remove contamination from the fluid and for providing a flushing system which completely cleans the nozzle and bulkhead interfaces upon which dirt may have accumulated. Only a small amount of fluid is used which can easily be removed from the reservoir by appropriate tools. No flushing of the entire hydraulic system is necessary and the flushing system is actuated automatically whenever fluid is delivered to the bulkhead.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

BRIEF DESCRIPTION OF THE DRAWINGS

FIG. 1 is an exploded perspective of the assembled hose portion and bulkhead portion of the device.

FIG. 2 is a side elevation partially sectioned of the invented fluid coupling.

FIG. 3 is an enlarged fragmentary side elevation partially sectioned of the invented fluid coupling.

DESCRIPTION OF THE PREFERRED EMBODIMENT

Although the invented device is susceptible of being used to deliver fluid from a hose to any container while flushing the interfaces thereof, the device is particularly useful for delivering hydraulic fluid under pressure through a hose to an aircraft bulkhead and will be described in connection with such use.

Referring now to FIG. 1, there is shown a fluid coupling device having generally two portions designated respectively A and B. Section A is a hose portion connected to a source of hydraulic fluid. Section B is the permanent bulkhead attachment which is attached to an aircraft or other vehicle receiving the fluid. When in use, sections A and B are coupled together by lock nut 24 thus activating the flushing system as hereinafter described.

With reference now to FIGS. 2 and 3, section A of the device is a portion of the hydraulic fluid delivery hose having an inlet port 14 entering a fluid containing cavity 16 from which fluid flows along conduit 17. Housing 12 is threaded and is attached to hose body 10. Bulkhead section B comprises a generally cylindrical threaded housing 18 having an outlet port 19, housing 18 being threadably engaged to a threaded sleeve 20 which can be attached to hose body 10 by means of a lock nut 24. The manner in which lock nut 24 couples sections A and B will be described in more detail hereinafter. When hose section A is coupled to bulkhead section B housing section 12 is threadably engaged to one end of hose body 10. Threaded sleeve 20 is inserted at the other end of hose body 10 and housing 18 is threadably engaged to sleeve 20. Lock nut 24 then couples section A to B.

Hose body 10 has an outlet port 46. A poppet 41 is seated against outlet port 46 thereby closing it. Biasing means 44 which can conveniently be a spring, serves to press poppet 41 against the sides of poppet sleeve 40 defining the outlet port. Poppet 41 has a protrusion 42 located on its front face. Poppet sleeve 40 is seated against the sides of hose body 10 defining outlet port 46 by biasing means 47 and slidably engages poppet 41. When poppet 41 and poppet sleeve 40 are in the closed position, fluid coming through conduit 17 cannot flow through outlet port 46. Poppet 41 is seated with its front face closing off outlet port 46 and making sliding contact with poppet sleeve 40 on either side, closing the outlet therein as is best seen in FIG. 3. When poppet sleeve 40 is in the closed position, it contacts face 49 of valve body 10 thereby sealably engaging it. Poppet sleeve 40 is held in the closed position by spring 47. The rearwardly portion of spring 47 is urged against interior hose housing 12a having therein conduit 17 and protruding tubular member 17a. The front end of spring 47 circumferentially fits around poppet sleeve 40 and presses against face 40a urging the poppet sleeve forwardly.

Biasing means 44 is located within poppet 41 and its backwardly end urges against the front of tubular protrusion 17a and its forward end rests on the interior face 41a of poppet 41 urging it forwardly to the closed position.

Surrounding the poppet sleeve 41 and on the interior of hose body 10 is located reservoir 45 which is adapted to receive a predetermined quantity of fluid. Reservoir 45 contains a predetermined amount of gas which provides compensating pressure within the reservoir; thus fluid will enter the reservoir until the gas is compressed sufficiently to exert a compensating pressure that counteracts the pressure of the entering hydraulic fluid thus preventing any further fluid from entering the reservoir. In the presently preferred embodiment of the invention, a compressed gas is used to provide the compensating pressure.

A port 51 is provided in hose body 10 adjacent reservoir 45 and on the underside of valve body 10. A threaded closure 52 is provided to seal port 51. The port 51 is adapted to receive a valve or other means for removing contaminated liquid from reservoir 45 without allowing compensating gas 50 to escape. Closure 52 can conveniently be a threaded nut. It is within the scope of the invention to provide a radial paper filter unit 60 located within housing 12. Such filter units are well known in the art, one such is manufactured by Purolator Products, Inc. These serve to filter the hydraulic fluid prior to its flowing through conduit 17 into the valve.

The bulkhead portion B of the fluid coupling device comprises a generally cylindrical threaded housing 18 having an outlet 19 therein. A threaded sleeve 20 is threaded onto generally cylindrical housing 18 to define a chamber 33 therein. A pin 28 having a threaded anchor portion 29 is longitudinally located within bulkhead portion B such that it protrudes from the front end thereof to a position forward of the ends of threaded sleeves 20.

A poppet 26 is located within chamber 33 such that its front face is seated within the opening defined by threaded sleeves 20 thereby closing said opening. Pin 18 extends longitudinally through the central portion of poppet 26 and is fixedly attached therein. Spring means 30 has its front edge urging the back face 26a of poppet 26 forwardly and has its backwardly portion engaging housing 18. Spring 30 is of higher compressive value than spring 47 in the hose portion. Thus, fluid under pressure will cause poppet sleeve 40 to retract before poppet 26 can retract. Ports 35 in the bulkhead portion allow fluid to leave chamber 33 and to flow through outlet 19 when poppet 26 is open.

The hose section A is coupled to the bulkhead section B by lock nut 24 which is threaded onto threaded sleeve 20. A snap ring 22 fits into a groove 22a in valve body 10 which retains lock nut 24 in position when it is placed in groove 22a.

When bulkhead portion B is coupled to hose section A, pin 28 engages rounded protrusion 42 of poppet 41 and unseats poppet 41 by overcoming the force of spring 44 which is urging poppet 41 forwardly. Fluid under pressure introduced at port 14 acts on the interface between poppet 26, poppet sleeve 40 and threaded sleeve 20. Because spring 47 is of lower compressive value than spring 30, poppet sleeve 40 is forced to retract against the urgings of spring 47. The retraction of poppet sleeve 40 allows the fluid to flow between the interface surfaces of poppet sleeve 40, threaded sleeve 20, poppet 26, and hose body 10. The flushing liquid removes accumulated contamination on the interface surfaces and enters fluid reservoir 45 where compensating gas 50 is compressed. Fluid flow will continue into reservoir 45 until there is no pressure differential between pressure compensating gas 50 and the compression of spring 30. At this time, poppet 26 is forced open by the fluid pressure, thus allowing fluid to flow into chamber 33, out through ports 35 and outlet 19 of the bulkhead.

Residual fluid pressure in the hose housing 10 exerts a locking pressure on sleeve 20 and nut 24 which cannot be counterrotated for disconnection until pressure is relieved from contaminate reservoir 45 by mechanical means, thus insuring the flushing action on a subsequent connection.

To remove contaminated liquid from reservoir 45 threaded nut 52 can be removed and any conventional valve means placed in the port so that contaminated liquid can be removed without removing the compensating gas 50.

To prevent leakage at the connecting portions of the hose body 10, hose body 12a and housing 12 and also between poppet sleeves 40, threaded sleeve 20 and hose body 10, a series of 0 rings 13, 13a and 21, 21a and 21b and 21c are located at the contacting faces. A conventional radial paper filter unit 60 can be inserted within hose housing 12 to filter the hydraulic fluid before it enters conduit 17 and flows into the chamber.

In operation, hydraulic fluid under a pressure of up to 4,000 p.s.i. enters section A through inlet 14 through filter 60 and into the chamber defined by poppet sleeve 40 and poppet 41. Typically, the hydraulic fluid is under a pressure of up to 4,000 p.s.i. Bulkhead section B is then mated to hose section A by threading lock nut 24 onto threaded sleeve 20. Snap ring 22 is then placed into position in groove 22a making it impossible to counterrotate lock nut 24. No fluid flow is possible until the two sections A and B are mated. When bulkhead section B is coupled to hose section A, pin 28 engages protrusion 42 and unseats poppet 41 against the urging of spring 44. Fluid entering the chamber from conduit 17 then flows out through exit port 46 and acts upon the interfaces of poppet sleeve 40, threaded sleeve 20 and poppet 26. Since spring 30 is of a higher compressive value than spring 47 and is therefore more difficult to compress, the pressure of the incoming fluid causes poppet sleeve 40 to retract against the urging of spring 47 while poppet 26 which is urged forwardly by stronger spring 30 remains closed. When poppet sleeve 40 retracts the fluid flows along the interfaces of poppet sleeve 40, hose body 10, poppet 26 and threaded sleeve 20 into contaminant reservoir 45. This flushing action removes accumulated particles of dirt from these interfaces and forces them into fluid reservoir 45. Fluid continues to flow into reservoir 45 until the pressure of the compensating gas equals the pressure of the hydraulic fluid and therefore stops any more fluid from flowing into the reservoir. Fluid pressure then continues to build up because of the fluid entering at port 14 until the force of spring 30 is overcome. Thus, fluid pressure acting on the face of poppet 26 causes poppet 26 to retract allowing fluid to enter chamber 33 and to flow into the bulkhead through ports 35 and outlet 19.

The hydraulic fluid entering inlet 14 is filtered in filter unit 60 and passes into bulkhead section B and out through outlet 19 without encountering any contamination on the interfaces between the hose A and bulkhead section B.

After incoming hydraulic fluid has been delivered to the bulkhead section, lock nut 24 cannot be removed until all residual pressure is bled from hose section A. As has been previously described, this can be done through port 52. This feature insures that a new flushing action occurs each time fluid is to be delivered because a reservoir has been emptied, otherwise lock nut 24 cannot be removed.

It is apparent from the foregoing that the invented fluid coupling device has many advantages. The device makes possible the efficient flushing of the nozzle and bulkhead connection through which hydraulic fluid is to be delivered. This can now be accomplished automatically each time the sections of the device are coupled together without requiring the drainage of the complete system. The invented fluid coupling is well suited to handling liquids under high pressures while only requiring a small amount of fluid to decontaminate the interface surfaces. In addition, a conventional filter unit can be incorporated into the hose section A so that small particles which contaminate hydraulic fluid can be filtered out prior to the time at which they flow into the bulkhead.

The method of coupling the hose section to the bulkhead section is unique in that lock nut 24 cannot be removed until all pressure has been bled from the hose section. Thus, in order to remove the lock nut, all the contaminated liquid in reservoir 45 is first removed thus insuring a new flushing action when the two sections are again coupled.

Although this invention as been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A fluid coupling device comprising:
   a first hose housing having an inlet port for fluid, and having an outlet port;
   a second housing having an inlet port and an outlet port;
   means for coupling said first hose housing to said second housing;
   a fluid reservoir located adjacent the outlet port of said first hose housing, said fluid reservoir having a port;
   a first valve means located within said first hose housing, said first valve means being adapted to opening and closing the outlet port in said first hose housing;
   a second valve means located within the second housing, said second valve means being adapted to opening and closing the inlet port of said second housing;
   means connected to said second valve means for cooperatively engaging and opening said first valve means when said first hose housing and said second housing are coupled together;
   means connected to said first valve means for allowing a fluid under pressure to leave said first housing and to enter said fluid reservoir;
   means connected to said second valve means for opening said second valve means at a predetermined pressure and for allowing fluid to enter said second housing from said first housing; and
   means connected to said first valve means for preventing fluid that has entered said fluid reservoir from returning to said first housing or from entering said second housing.

2. The fluid coupling device as defined in claim 1 wherein said fluid coupling device further comprises a means for diverting to said reservoir the first fluid to flow through said first valve means, and wherein said first valve means comprises:
   a valve body defining an outlet port;
   a generally tubular poppet sleeve longitudinally disposed within said valve body, said poppet sleeve having sides adapted to sealably engage said valve body, and said poppet sleeve defining a part in the front end thereof;
   biasing means of a first compressive strength located circumferentially and adjacent said poppet sleeve, said biasing means being adapted to urging said poppet sleeve toward said outlet port;
   a generally tubular poppet having a front face, said front face of said poppet being adapted to sealably engage the port in the front end of said poppet sleeve, said poppet being located within said poppet sleeve and having its longitudinal axis parallel to the longitudinal axis of said poppet sleeve; and
   biasing means longitudinally located within said poppet and adapted to urge said poppet forwardly to sealably engage the port in said poppet sleeve.

3. The fluid coupling device as defined in claim 2 wherein said second valve means comprises:
   a generally tubular sleeve defining an inlet port in the front end thereof;
   a poppet having a front face, said poppet being located within said generally tubular sleeve, said poppet being adapted to sealably engage the generally tubular sleeve and to close the port in said sleeve;
   a biasing means of a second compressive strength higher than the first compressive strength of the biasing means in the first valve means, said biasing means being located rearwardly of said poppet and being adapted to urge said poppet to close the inlet port defined by said generally tubular sleeve; and
   an outlet port located rearwardly of said poppet.

4. A fluid coupling device comprising:
   a first hose housing having an inlet port for fluid and an outlet port and the walls of said housing defining a fluid reservoir;
   said hose housing comprising a first housing section and a hose body section, said housing section and said body section being adapted to threadably engage one another, said hose body section defining an opening in the front thereof;
   a poppet sleeve having a front end, said poppet sleeve walls defining an opening in said front end, said poppet sleeve being located longitudinally within said hose body section such that the walls and front face of said poppet sleeve are adjacent to and are adapted to sealably engage the walls of said hose body section, the rearwardly portion of said poppet sleeve being adapted to fit coaxially over the outlet port of said hose section;
   a spring having a front end and a rearwardly end, aid spring being circumferentially imposed around said poppet sleeve such that the rearwardly portion of the spring biases against the hose housing and the forwardly end of said spring biases against the front end of said poppet sleeve, the front end of said poppet sleeve being biased toward the front walls of said hose body portion and tending to seal said opening in said hose body portion closed;
   a poppet, said poppet being located longitudinally coaxially within said poppet sleeve, the front end of said poppet sleeve, the front end of said poppet being adapted to sealably engage said opening in the front face of said poppet sleeve, said poppet having a protrusion extending from the front end thereof and said poppet slidably engaging the bore of said poppet sleeve;
   a spring having a front end and a rearwardly end, said spring being longitudinally located within said poppet, the front end of said spring biasing the front end of said poppet and the rearwardly portion of said spring being contacted upon the hose housing adjacent said outlet port, said spring tending to bias said poppet into a closed position with respect to the opening in said poppet sleeve;
   a second housing being adapted to be coupled to said hose body section, said second housing comprising a sleeve member and a body member, said sleeve member and said body member being adapted to be threadably engaged and said sleeve member being adapted to threadably engage a locking member, said sleeve member defining a generally cylindrical space within said second housing and the walls of said sleeve member defining an opening at the front end of said generally cylindrical space and said body member defining a generally cylindrical conduit therein adapted to receiving fluid from the space at the front end of said sleeve member to conduct said fluid out through said generally cylindrical conduit member;

a poppet longitudinally located within the generally cylindrically chamber defined by the walls of said sleeve section, said poppet having a front face and being adapted to sealably engage the walls of said sleeve member and to seal the opening in the front thereof, said poppet having a pin longitudinally seated therein, said pin having a front end extending forwardly of said front face of said poppet;

a spring having a forward end and a rearward end, said spring being longitudinally located within the chamber defined by said sleeve such that the forwardly end of said spring biases said poppet into sealably engaging the walls of said sleeve and closing the opening therein, the rearwardly portion of said spring being nested against said generally cylindrical body section;

said second housing section being adapted to be coupled to said first housing section and said pin of said poppet in said second housing section being adapted to cooperatively engage the protrusion extending from the front face of the poppet in said first hose section thereby biasing said poppet so that fluid is free to flow through the opening defined by the walls of said poppet sleeve;

said spring of said second housing section being of a higher compressive value than the spring which biases said poppet sleeve into a closed position with said hose body; and locking means for coupling said first hose section to said second housing, said locking means being adapted to threadably engage said sleeve member of said second housing.

5. The structure as defined in claim 4 wherein said locking means comprises a snap ring which is adapted to engage a groove proximate the forward end of said hose body of the first hose section and a generally cylindrical lock nut being adapted to threadably engage the sleeve member of said second housing, the lock nut having a protrusion which is adapted to nest against said snap ring when the first hose section and said housing section are coupled together thereby locking the two sections together.

6. The structure as defined by claim 4 wherein an outlet port is provided into said hose body and into said fluid reservoir such that when said outlet port is opened fluid may be removed from said fluid reservoir without allowing gas to escape therefrom.

7. The structure as defined in claim 4 wherein a radial filter element is placed intermediate the inlet port and the outlet port of said first hose section such that fluid entering said first hose section must flow through aid filter element before leaving through said outlet port.

8. The structure as defined in claim 4 wherein the spring of said second poppet within said second housing section has compressive value such that fluid pressure entering at the inlet port of the first housing section when acting upon the face of said poppet will be sufficient to overcome said compressive value and allow said poppet to be disengaged from the walls of said sleeve and to define an opening at the front face of said sleeve thereby allowing fluid to enter said generally cylindrical chamber within said second housing.

9. The structure as defined in claim 8 wherein said spring biasing said poppet sleeve in said first hose body has a lower compressive value than the compressive value of the spring in said second housing section, said spring being adapted to be biased by fluid pressure acting upon the front face of said poppet sleeve and causing said poppet sleeve to move away from the opening defined by the walls of said hose body thereby defining a flow path for fluid into the fluid reservoir.

10. The structure as defined in claim 9 wherein said fluid reservoir is a generally cylindrical chamber defined by the walls of said hose body, said fluid reservoir containing a compressible gas such that when a predetermined amount of fluid has entered said fluid reservoir the gas is compressed and prevents any further influx of fluid, the pressure of fluid entering said inlet port and said fluid reservoir being just balanced by the force exerted by the compressed gas, said fluid reservoir being adapted to admit fluid when said poppet sleeve is in the retracted position, said fluid entering into said fluid reservoir when said poppet is in the retracted position.